United States Patent
Sutton et al.

(10) Patent No.: US 10,122,179 B2
(45) Date of Patent: Nov. 6, 2018

(54) POWER SUPPLIES WITH FEEDBACK

(71) Applicant: QUALCOMM Incorporated, San Diego, CA (US)

(72) Inventors: Todd Sutton, Del Mar, CA (US); Charles Tuten, Scottsdale, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 15/192,840

(22) Filed: Jun. 24, 2016

(65) Prior Publication Data
US 2017/0338662 A1 Nov. 23, 2017

Related U.S. Application Data

(60) Provisional application No. 62/338,614, filed on May 19, 2016.

(51) Int. Cl.
*H02J 1/10* (2006.01)
*H02J 4/00* (2006.01)

(52) U.S. Cl.
CPC ..................... *H02J 4/00* (2013.01)

(58) Field of Classification Search
CPC .......................................................... H02J 4/00
See application file for complete search history.

(56) References Cited

U.S. PATENT DOCUMENTS

| | | | |
|---|---|---|---|
| 6,900,697 B1 * | 5/2005 | Doyle | H03F 1/0222 330/296 |
| 7,202,646 B2 | 4/2007 | Vinciarelli | |
| 7,592,789 B2 | 9/2009 | Jain | |
| 8,243,410 B2 | 8/2012 | Ayyanar et al. | |
| 9,191,013 B1 | 11/2015 | Kim et al. | |
| 2006/0022653 A1 | 2/2006 | Reed et al. | |
| 2013/0300392 A1 | 11/2013 | Laur et al. | |
| 2014/0210266 A1 * | 7/2014 | Tournatory | H02M 3/158 307/31 |
| 2015/0123633 A1 | 5/2015 | Bulzacchelli et al. | |
| 2015/0177824 A1 | 6/2015 | Ganpule et al. | |
| 2015/0222182 A1 | 8/2015 | Searles et al. | |
| 2015/0381026 A1 * | 12/2015 | Tournatory | H02M 3/158 323/271 |

OTHER PUBLICATIONS

Haj-Yihia J., et al., "Compiler-Directed Power Management for Superscalars," ACM Transactions on Architecture and Code Optimization, Dec. 2014, vol. 11 (4), Article 48, pp. 48.1 to 48.21.

(Continued)

*Primary Examiner* — Jared Fureman
*Assistant Examiner* — Duc M Pham
(74) *Attorney, Agent, or Firm* — Haynes and Boone, LLP IP Section (57) ABSTRACT

Features and advantages of certain embodiments include a plurality of power supplies that work together to deliver power to a target circuit. In one embodiment, a downstream power supply provides a fast current delivery in response to load current transients and generates a feedback signal to control an upstream power supply so that the upstream and downstream power supplies work together to meet the current and voltage requirements of a target circuit across a wide range of loading conditions.

21 Claims, 7 Drawing Sheets

(56) References Cited

OTHER PUBLICATIONS

Sturcken N., et al., "A Switched-Inductor Integrated Voltage Regulator with Nonlinear Feedback and Network-on-Chip Load in 45 nm SOI," IEEE Journal of Solid-State Circuits, Aug. 2012, vol. 47 (8), pp. 1935-1945.
International Search Report—PCT/US2017/028308—ISA/EPO—dated Jul. 19, 2017.
Written Opinion—PCT/US2017/028308—ISA/EPO—dated Jul. 19, 2017.

* cited by examiner

POWER SUPPLIES WITH FEEDBACK

CROSS-REFERENCED APPLICATIONS

The present application claims priority to U.S. Provisional Patent Application No. 62/338,614, filed on May 19, 2016, which is incorporated by reference in its entirety.

BACKGROUND

The present disclosure relates to power delivery.

Delivering power to modern electronic circuits is becoming increasingly challenging. Microprocessors, graphics processors, systems on a chip (SoC's), multi-chip modules (MCMs), and other large scale integrated systems are drawing increasing amounts of power, in the form of voltage and current, at ever increasing speeds. However, in order for the circuits in such systems to operate properly, these systems may require a voltage on a power supply rail that is maintained within some nominal range across a wide variety of load current conditions. For example, a power supply rail for a microprocessor may have nominal voltage Vdd. When the microprocessor is operating in a low power consumption mode (e.g., drawing only a small or modest current), Vdd should be maintained below some maximum value for Vdd. Similarly, when the microprocessor rapidly transitions from a low power consumption mode to a high power consumption mode, a very rapid increase in current may occur, but Vdd should be maintained above some minimum value for Vdd.

External power supply circuits have traditionally been used to supply voltage and current to power supply rails of target circuits, such as microprocessors and the like. However, traditional power supply circuit architectures are challenged by the power demands of modern target circuits, where current requirements are increasing, power supply voltages are decreasing, and load current steps are becoming faster and faster.

SUMMARY

Features and advantages of certain embodiments include a plurality of power supplies that work together to deliver power to a target circuit. In one embodiment, a downstream power supply provides a fast current delivery in response to load current transients and generates a feedback signal to control an upstream power supply so that the upstream and downstream power supplies work together to meet the current and voltage requirements of a target circuit across a wide range of loading conditions.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
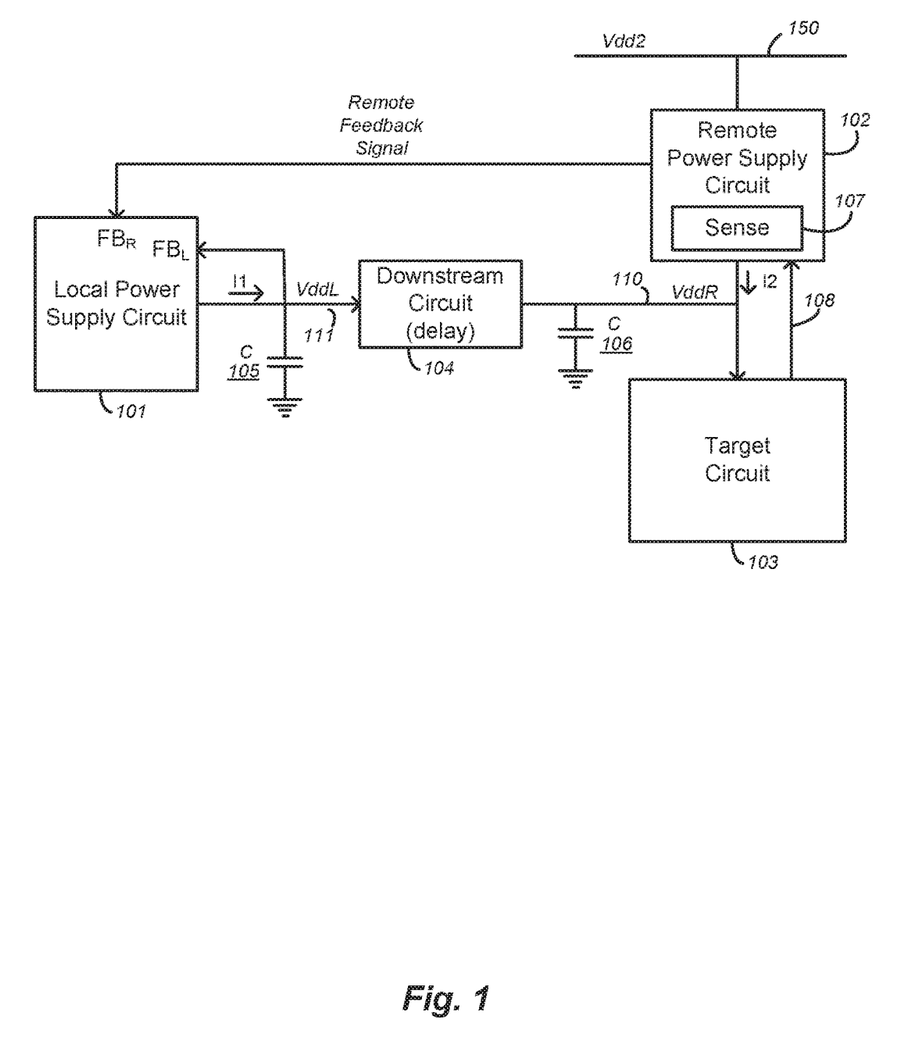
FIG. 1 illustrates a power supply circuit configuration according to an embodiment.

FIG. 1 illustrates a power supply circuit configuration according to an embodiment. Embodiments of the present disclosure include dual power supplies configured to provide power (voltage and current) to a target circuit. As illustrated in FIG. 1, a (first) local power supply circuit 101 produces a local current I1 and a local voltage VddL to a local power supply rail 111. A downstream circuit 104 is configured to receive the local current I1 and the local voltage VddL from the local power supply circuit 101 and produce a remote voltage VddR on a remote power supply rail 110. Examples of downstream circuits 104 may include parasitic capacitances (e.g., from conductive traces or metals), parasitic inductances (e.g., from package wires or connections), or power distribution fabrics or switches (e.g., from a block head switch (BHS)). Remote power supply rail 110 is coupled to a power supply input of a target circuit 103 to provide remove voltage VddR and a load current to the target circuit.

Features and advantages of the present disclosure include a second power supply circuit 102 downstream from the local power supply circuit 101 to provide current to the remote power supply rail 110 in response to loading events, such as rapid increases in the current drawn by target circuit 103, for example. As illustrated in FIG. 1, a second (or remote) power supply circuit 102 has an output coupled to the remote power supply rail 110. Downstream circuit 104 may cause a delay in delivering power from the local power supply circuit 101 to the target circuit 103, for example, which may cause VddR on remote power supply rail 110 to droop when a loading event occurs in target circuit 103. Remote power supply circuit 102 may be configured near the target circuit 103, for example. Additionally, remote power supply circuit 102 may be physically smaller in size than local power supply circuit 101 and may have a different topology. Accordingly, remote power supply circuit 102 may be configured to respond to a loading event on the remote power supply rail 110 faster than the local power supply circuit 101, for example. In some embodiments, the remote power supply circuit 102 may provide a current within a first time period in response to the loading event, while the local power supply circuit 101 may provide a current and/or a voltage within a second period that is longer than the first time period in response to the loading event.

As illustrated in FIG. 1, remote power supply circuit 102 may be coupled to a second remote power supply rail 150, which may have a higher voltage value Vdd2 than VddR on rail 110 (Vdd2>VddR), for example, to couple energy into remote power supply rail 110 quickly in response to loading events. Advantageously, remote power supply circuit 102 may be configured to sense a loading event on remote power supply rail 110, which due to the proximity of the remote power supply circuit to the target circuit may provide for much faster response times. As mentioned above, remote power supply circuit 102 provides a remote current I2 to the remote power supply rail 110 for target circuit 103 in response to a loading event, e.g., from the circuit 103 and/or on the rail 110. Remote power supply circuit 102 may include a sense circuit 107 to sense a loading event. In various embodiments described herein, remote power supply circuit configurations may include voltage sensors, current sensors, or clock sensors, for example, to sense a loading event. Accordingly, sense circuits in remote power supply circuit 102 may sense current or receive voltage VddR or a clock signal at 108 from target circuit 103.

Embodiments of the present disclosure may advantageously include a remote power supply circuit 102 that generates a remote feedback signal produced in response to a loading event and coupled to local power supply circuit 101, for example. Accordingly, local power supply circuit 101 is configured to receive the remote feedback signal and produce a local current I1 and a local voltage VddL to a local power supply rail 111 in response to the remote feedback signal. As illustrated below, in some embodiments local power supply circuit 101 may also receive a local feedback signal based on local voltage VddL on rail 111, for example. Using various embodiments of the configuration illustrated in FIG. 1, one power supply circuit may provide fast transient power to a target circuit in response to loading events, and another power supply circuit may receive a feedback signal indicating that the loading event has occurred so the voltage and current can be modified to meet the changing downstream loading requirements of the target circuit.

In this embodiment, local power supply circuit 101 may be the primary source of power for the target circuit 103 and the second power supply circuit 102 may primarily provide transient power to target circuit 103, for example. Because power supply circuit 102 provides a remote feedback signal to power supply circuit 101, power supply circuit 102 is referred to herein as the "remote" power supply and power supply circuit 101 is referred to herein as the "local" power supply. Those skilled in the art will recognize that this is merely a naming convention and that the names could be reversed or other names could be utilized.

Figure 2:
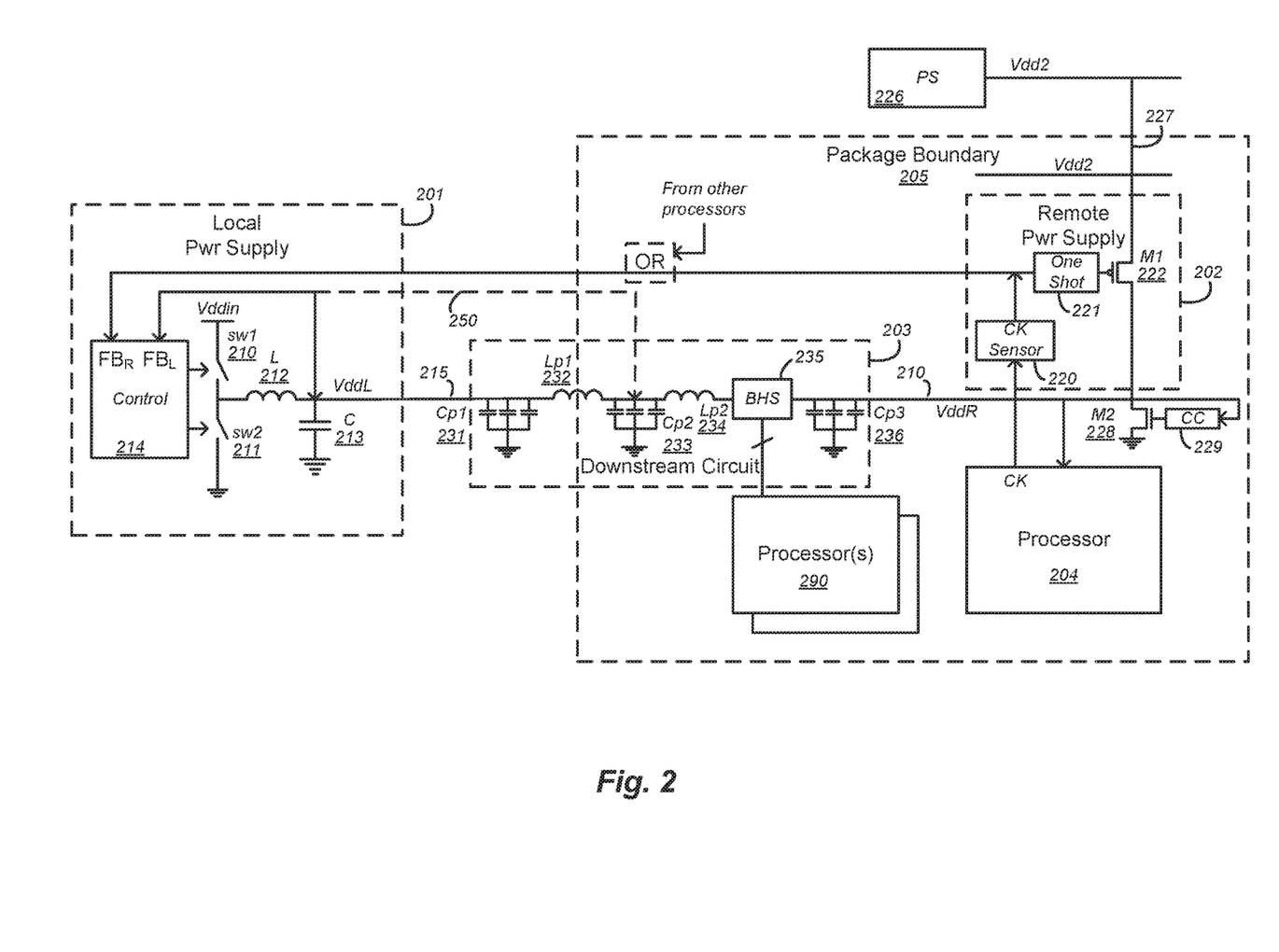
FIG. 2 illustrates an example power supply circuit configuration according to an embodiment.

FIG. 2 illustrates an example power supply circuit configuration according to another embodiment. In this example, local power supply circuit 201 is a switching regulator comprising a high side switch 210, a low side switch 211, an inductor 212, and an output capacitor 213. Switches 210 and 211 may be MOS transistors, for example. The switching regulator receives a power supply input voltage, Vddin, and produces a local power supply rail voltage VddL, which is regulated by local and remote feedback signals ("FB$_L$" and "FB$_R$") at the input of control circuit 214. In this example, Vddin is greater than VddL, and the switching regulator is a Buck switching regulator, for example. As illustrated in FIG. 2, local feedback 250 according to various embodiments may be provided from capacitor 213 or a point farther downstream such as capacitance 233, for example.

In this example, VddL is coupled through a downstream circuit 203 comprising parasitic capacitance 231, 233, and 236, parasitic inductance 232 and 234, and a block head switch (BHS) 235 to produce a remote power supply rail voltage VddR. The BHS provides a way to disconnect the target circuit 103 in FIG. 1, or Processor 204, from the remote supply rail 110 in FIG. 1, or VddR, in order to reduce the power consumption during times of Target Circuit 103, or Processor 204, inactivity. The downsteam circuit in this example may include parasitics L and C associated with the boundary 205 of an integrated circuit (IC) or multi-chip module (MSM) package. BHS 235 may distribute VddL to target circuits on the IC such as processor 204 and/or one or more other processors 290, for example, each of which may also include a remote power supply circuit as described herein. The remote voltage VddR on the remote power supply voltage rail 216 at parasitic capacitors 236 is coupled to processor 204. The supply 201 may in some embodiments be implemented in a power management integrated circuit (PMIC), which may be separate from and/or external to the package defined by the boundary 205.

In this example, remote power supply circuit 202 comprises a circuit for delivering packets of charge to rail 216. For example, circuit 202 includes a PMOS transistor 222 having a first terminal coupled to the remote power supply rail 216, a second terminal coupled to a second remote power supply rail 227 having a voltage Vdd2 greater than VddR. Power supply rail 227 may be driven by another off package power supply 226, for example, which may provide a second on-package rail voltage greater than VddR. A control terminal of transistor 222 is driven by a one shot circuit 221. Circuit 221 turns ON transistor 222 for a predetermined time period in response to receiving a load event signal to deliver a packet of charge from Vdd2 to VddR to maintain VddR from drooping in response to an increase in load current. One-shot circuit 221 has an input coupled to receive the load event signal generated by a sense circuit 220 (described below) and an output coupled to the control terminal of transistor 222. In this example, the sense circuit 220 is a clock sense circuit to sense a loading event and generate a load event signal. The loading event in this case may be when a particular processor clock turns ON, for example, which may indicate that the processor load current is going to increase. Because one-shot 221 and transistor 222 deliver packets of charge (or coulombs), these components together are sometimes referred to as a "coulomb cannon."

In this example, the load event signal is also the remote feedback signal. For example, when the sensed processor clock transitions ON, the load event signal is generated to trigger the one-shot 221 to turn the PMOS 222 ON for a predetermined time period (i.e., fire the coulomb cannon). The load event signal is also transmitted to a remote feedback input, FB$_R$, of control circuit 214 to adjust the operation of local power supply 201. For example, in one embodiment, local feedback may implement a voltage control loop and/or a current control loop, and the remote feedback may cause the high side transistor to turn ON. For instance, the high side transistor may be triggered to turn ON and OFF during a typical switching regulator cycle by a latch in the control circuit 214. Receiving the remote feedback signal at the remote feedback input (FB$_R$) may trigger a latch to turn the high side switching transistor ON (e.g., immediately) to couple Vddin to the local power supply rail 215 for a predetermined time period, which may be greater than the typical time period the high side transistor is typically ON during a cycle. In particular, the high side switch may be turned ON early during a pulse width modulation switching cycle and remain ON for the remainder of the cycle and possibly one or more subsequent cycles, for example. Thus, the ON time of the high side switching transistor is increased during one or more duty cycles of the switching regulator. In another embodiment, the remote feedback signal may be introduced into the voltage control loop or the current control loop, for example. The result is to increase the switching regulator output current or output voltage or both to quickly provide more power downstream to compensate for a loading event.

As mentioned above, a package may include many target circuits, such as one or more processors on a signal IC or module. Each such processor may have a similar remote power supply circuit 202. Accordingly, each of the processors may generate load event signals, which may be combined in an OR gate (shown in dashed lines in FIG. 2) and used as the remote feedback signals to cause local power supply circuit 201 to respond to loading events from multiple different processors. FIG. 2 also illustrates a low side coulomb cannon 229 and low side transistor 228 for sensing increases in the rail voltage VddR and discharging packets of charge to maintain VddR below some maximum nominal value.

Figure 3:
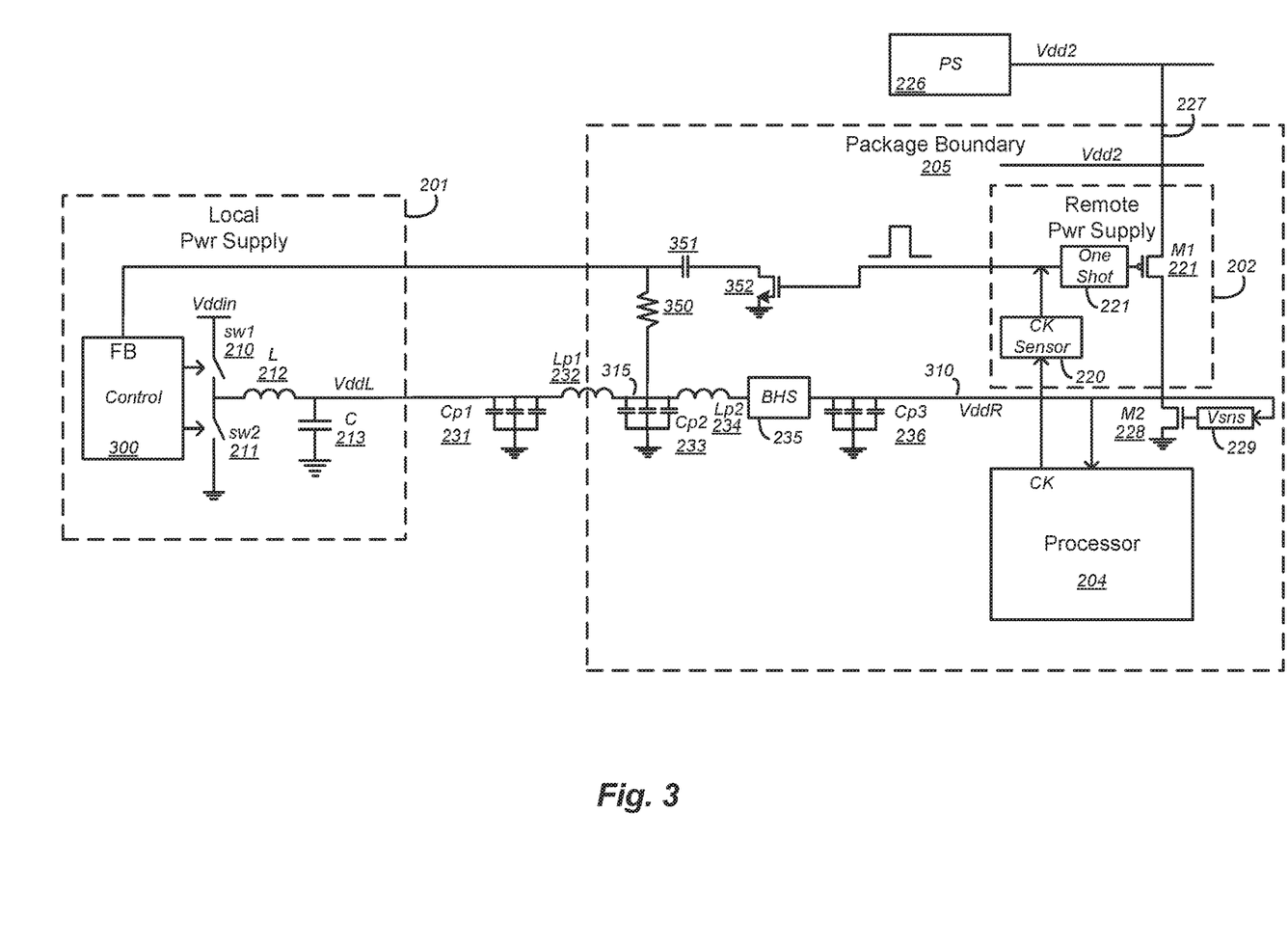
FIG. 3 illustrates another example power supply circuit configuration according to an embodiment.

FIG. 3 illustrates another example power supply circuit configuration according to an embodiment. In some embodiments, the remote feedback signal may modify the local feedback signal to increase the local current from the local power supply when a remote voltage on the remote power supply rail drops below a nominal value. In this example, the remote feedback signal and the local feedback signal are combined using capacitor 351 and resistor 350 to produce a modified feedback signal to control circuit 300. Here, a load event signal is a positive pulse which is inverted by pull-down 352 and AC coupled through capacitor 351 into the feedback path of the local power supply circuit. Capacitor 351 has a first terminal configured to receive the remote feedback signal and a second terminal coupled to a feedback input (FB) of the local power supply and to the power supply rail 315 (e.g., through resistor 350). The negative pulse of the remote feedback signal results in the feedback input being reduced (the local power supply output appears lower than it actually is for the period of the pulse), which causes the local power supply to increase the local voltage VddL (and current) for a predetermined time period, for example.

Accordingly, in this example, when a loading event occurs, a load event signal is generated, which causes the coulomb cannon to fire charge into the remote power supply rail 310 and also reduce the feedback FB (e.g., a voltage) to the local power supply. The time period for closing transistor 222 (e.g., the size of the charge packets) may be customized to inject just enough charge to maintain the remote power supply rail 310 above a minimum voltage until an increase in the local output voltage from local supply 201 propagates to the remote power supply rail 310 to provide the increased load current.

Figure 4:
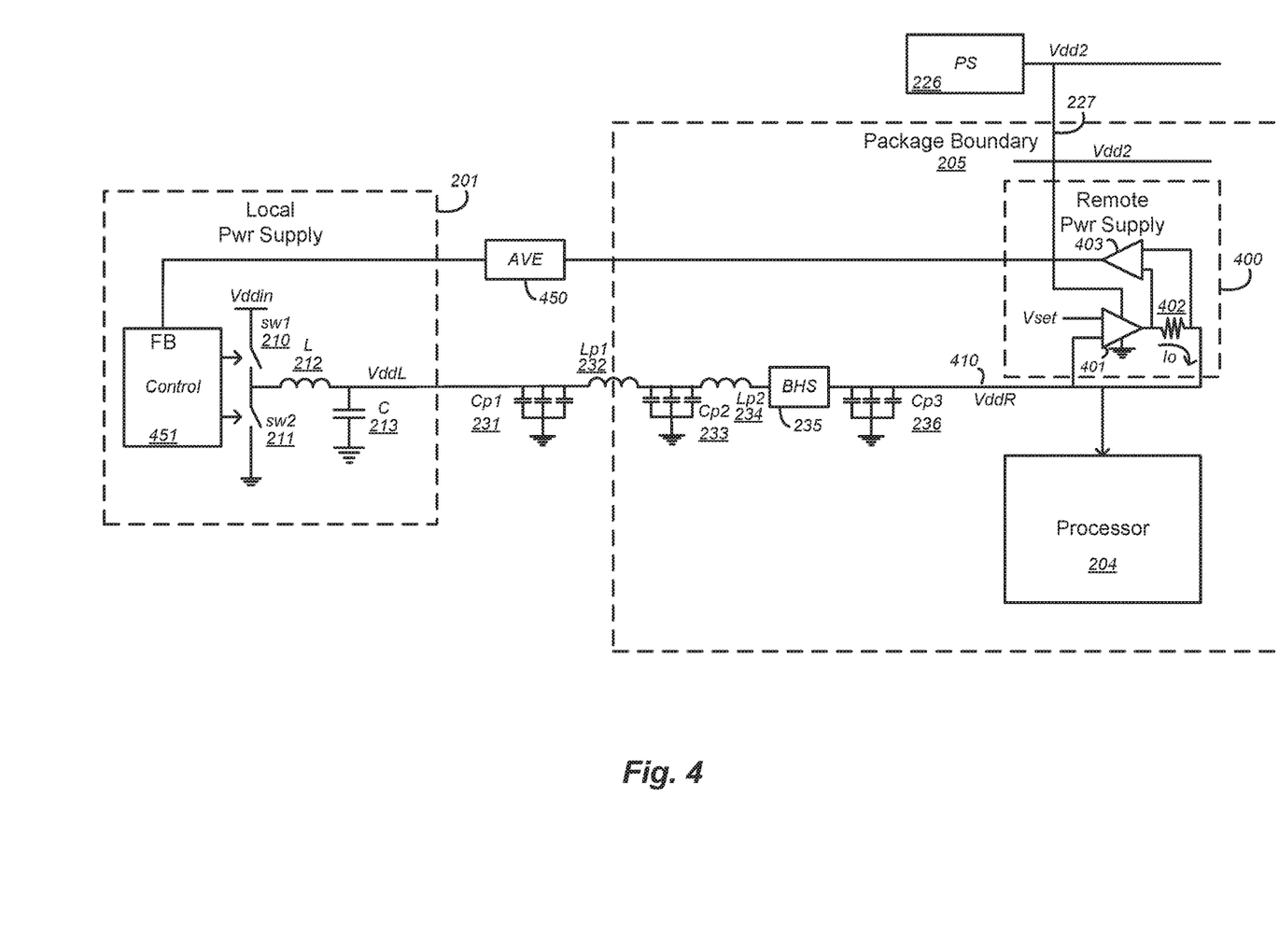
FIG. 4 illustrates another example power supply circuit configuration according to an embodiment.

FIG. 4 illustrates another example power supply circuit configuration according to an embodiment. In this example, a remote power supply circuit 400 includes an amplifier 401 and a current sensor (e.g., resistor 402 and amplifier 403). Amplifier 401 has an input coupled to a reference voltage, Vset, and an output coupled to the remote power supply rail 410. In this example, a second input of amplifier 401 is coupled to remote power supply rail 410. Accordingly, VddR is compared to Vset. When VddR falls below Vset (e.g., in response to a loading event), amplifier 401 may produce an output current Io into rail 410. In this example, the output current is sensed by resistor 402 to produce a voltage, which is sensed by amplifier 403. Amplifier 403, in turn, produces a remote feedback signal, which in this case is a signal that corresponds to the current into the rail 410 from remote power supply 400. The feedback signal may be incorporated into the feedback loop of control circuit 451 to cause local power supply 201 to produce more voltage or current as needed to meet the current demands of the target circuit (here, a processor 204). In this example, the mechanism for sensing current from the remote power supply to the remote power supply rail to generate the remote feedback signal is implemented using a resistor and amplifier. However, it is to be understood that other current sensor circuits and configurations could also be used such as parallel sense transistor circuits, for example.

In one embodiment, an averaging circuit 450 is configured to receive the feedback signal and produce an average, for example. The averaging circuit 450 may have an input coupled to a current sensor in remote power supply circuit 400 to receive the remote feedback signal and an output coupled to a feedback input (FB) of the local power supply 201. Accordingly, local power supply may respond to an average current from remote power supply 400 to produce average current to the target circuit, for example. Example averaging circuits may include a filter (e.g., a low pass filter (LPF)), integrator, or proportional-integral-differential (PID) control circuit, for example.

Figure 5:
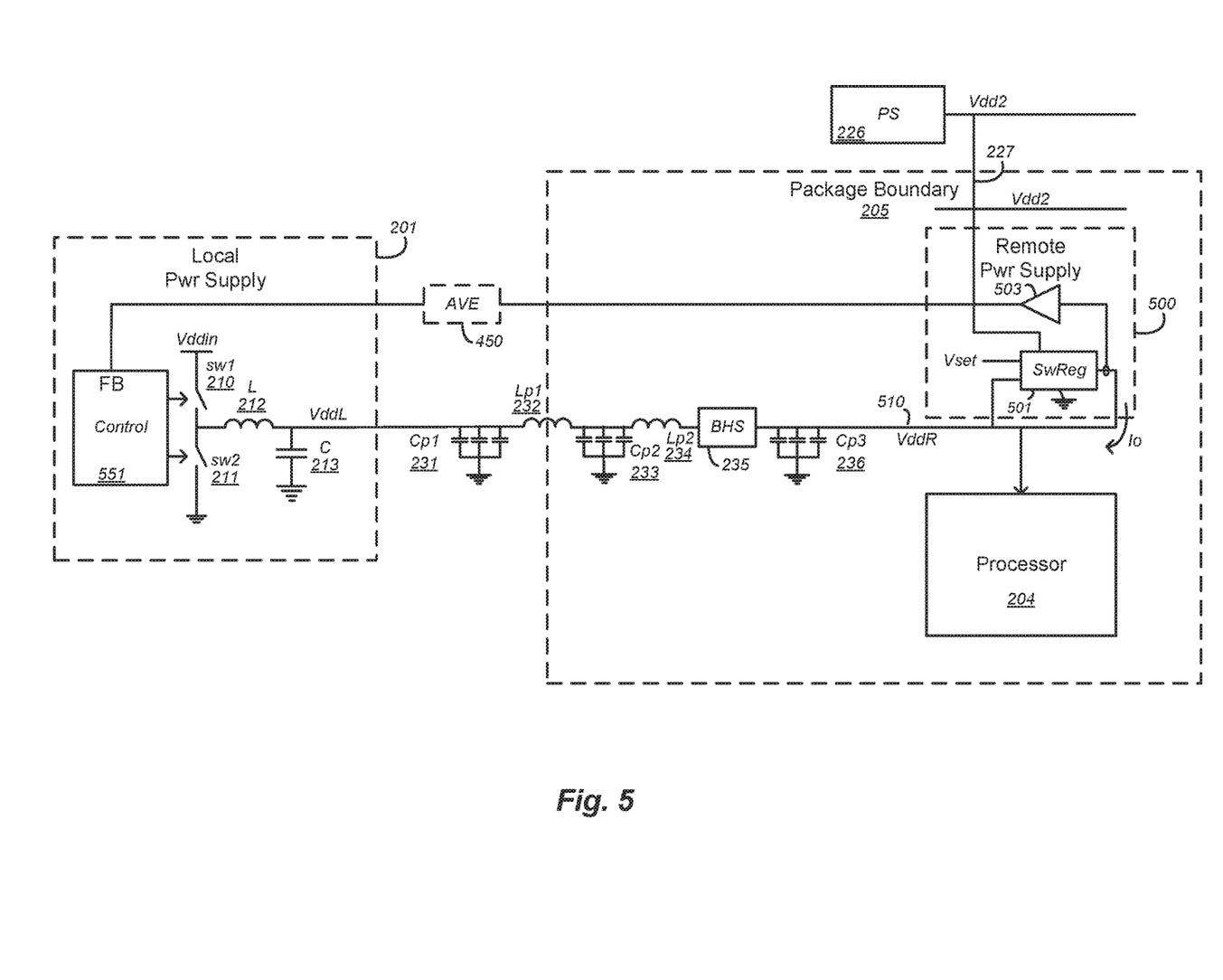
FIG. 5 illustrates another example power supply circuit configuration according to an embodiment.

FIG. 5 illustrates another example power supply circuit configuration according to an embodiment. In this example, remote power supply circuit 500 includes a switching regulator 501 having an input coupled to a second remote power supply rail 227 having a voltage Vdd2 greater than a voltage VddR on remote power supply rail 510. Switching regulator 501 further includes a control input coupled to a reference voltage, Vset, for setting the output voltage of the regulator, for example. Switching regulator 501 has an output coupled to the remote power supply rail 510 to produce an output current Io. In this example, the switching regulator further includes a feedback input coupled to the remote power supply rail 510 to sense voltage VddR. VddR is compared to Vset, and when VddR starts to deviate from a nominal value of Vset (e.g., due to a loading event), switching regulator 501 responds by driving current to into or out of remote power supply rail 510 to drive VddR back to Vset, for example. In this example, because the switching regulator input Vdd2 is greater than the output VddR, the switching regulator is a Buck switching regulator (i.e., Vin>Vout).

Remote power supply circuit 500 further includes a current sensor 503 configured to sense current from the output of the switching regulator 501 to the remote power supply rail 510, and in accordance therewith, generate a remote feedback signal. The remote feedback signal is coupled to a feedback input (FB) of a control circuit 551 of an upstream local power supply circuit 201. As mentioned above in connection with FIG. 4, the feedback signal may be received by an averaging circuit 450 so that local power supply circuit 201 produces an average of the current being produced by remote power supply circuit 500. Accordingly, remote power supply circuit 500 may be a smaller, faster switching regulator configured to respond to load transients and produce transient currents, and local power supply circuit 500 may be a larger, slower switching regulator configured to drive slower average currents.

Figure 6:
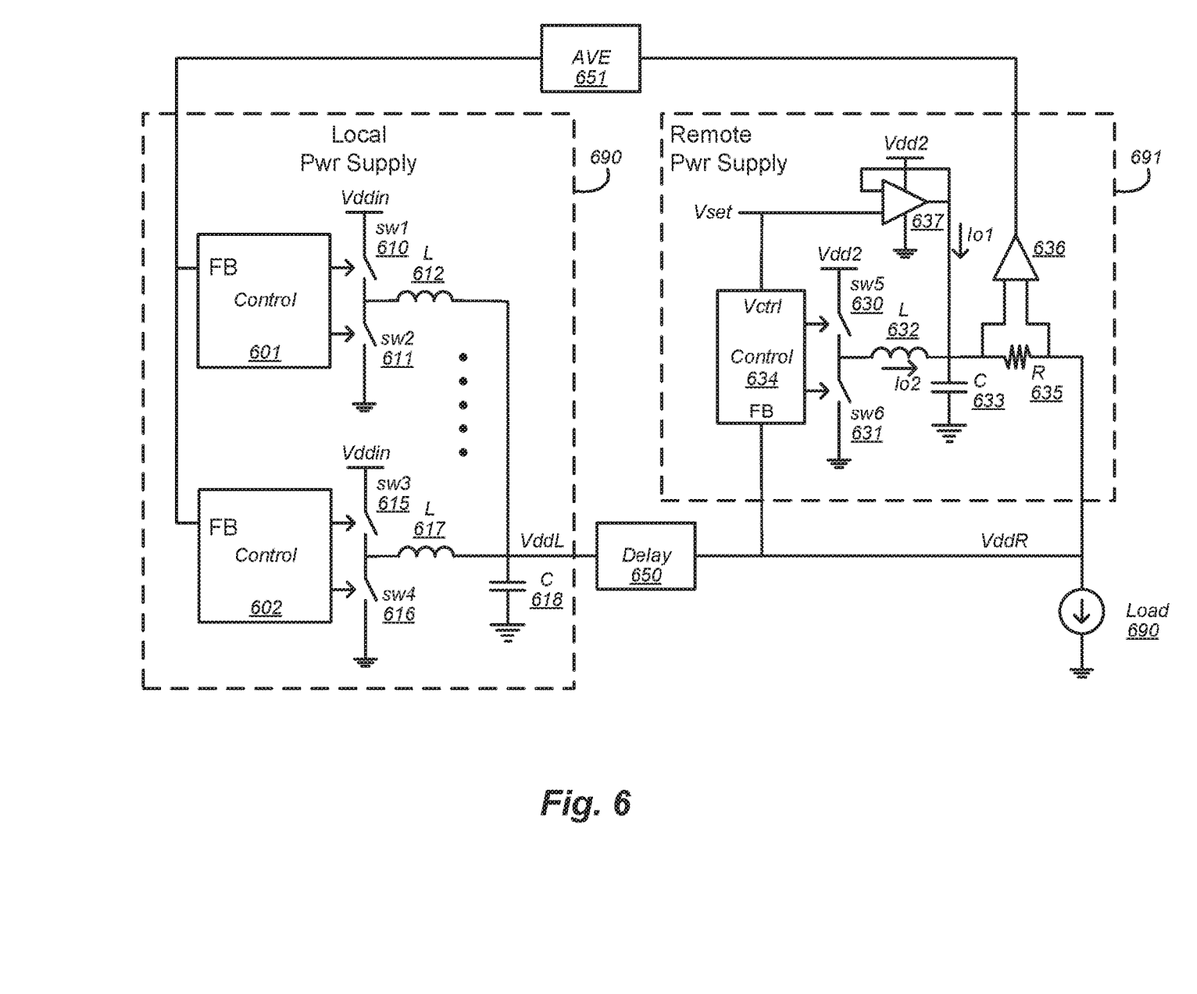
FIG. 6 illustrates another example power supply circuit configuration according to an embodiment.

FIG. 6 illustrates another example power supply circuit configuration according to an embodiment. In this example, local power supply circuit 690 includes a multiphase switching regulator comprising multiple inductors 612 and 617 driven by two switching stages including switches 610/611 and 615/616 to produce voltage VddL on capacitor 618 (voltage and current control loops not shown). VddL is coupled through a delay circuit 650, such as parasitic inductances and capacitances, for example, to produce a downstream remote power supply rail voltage VddR on load 695.

In this example, remote power supply circuit 691 includes both a high speed linear amplifier and a high efficiency switching regulator configured to maintain VddR at a predetermined value, such as Vset, for example. The switching regulator comprises switches 630/631 coupled between a second remote power supply rail voltage Vdd2 and ground, where Vdd2>VddR and the switching regulator is a Buck switching regulator (i.e., Vin>Vout). An intermediate switching node between the switches is coupled though an inductor 632 to VddR. Voltage on the output of the switching regulator is VddR, which is regulated by control circuit 634 having a control input coupled to a reference voltage, Vset, a feedback input coupled to VddR, and driver outputs to turn switches 630/631 ON and OFF. Similarly, a linear amplifier 637 is powered between Vdd2 and ground, and may have one input coupled to Vset and a second input coupled to the output of the linear amplifier in a unity gain configuration, where the output of the linear amplifier is coupled to VddR. Accordingly, when VddR deviates from a nominal value set by Vset, the linear amplifier responds fastest with an output current Io1 and the switching regulator responds with a more efficient Io2 to maintain VddR at a nominal value.

In this example, a current sense circuit includes a series resistor 635 coupled between the load 695 and the outputs of the switching regulator and linear amplifier. A differential sense amplifier 636 translates a differential voltage across resistor 635 into a feedback signal corresponding to the current being driven into the load to maintain the load at a nominal value. As mentioned above, the feedback signal, which also corresponds to a loading event, may be averaged by circuit 651 and provided to feedback inputs of the switching regulator in the upstream local power supply circuit 690.

Figure 7:
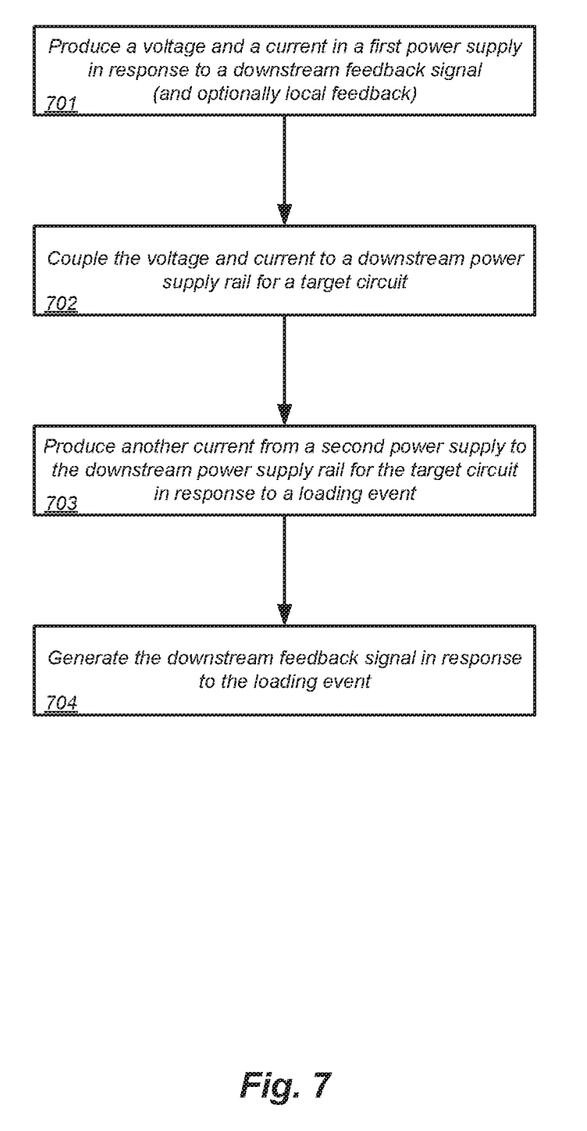
FIG. 7 illustrates a method of supplying power according to an embodiment.

FIG. 7 illustrates a method of supplying power according to an embodiment. Features and advantages of certain embodiments described herein may include a plurality of power supplies, where a downstream power supply (e.g., a coulomb cannon or Buck converter) provides a current delivery in response to load current transients and generates a feedback signal to control an upstream power supply (e.g., a larger Buck or Buck with greater power, current, and/or voltage output) so that the upstream and downstream power supplies work together to meet the current and voltage requirements of a target circuit across a wide range of loading conditions. For example, at 701 a voltage and a current may be produced by a first power supply (e.g., the power supply 101, 201, and/or 690). In various embodiments, the voltage and current from the first power supply may be produced in response to a downstream feedback signal, and may further be produced in response to local feedback, for example. The first power supply configured to produce current and voltage in response to a loading event on a downstream power supply rail within a first time period. At 702, the voltage and current are coupled to the downstream power supply rail for a target circuit. As described above, the voltage and current from the first power supply may be coupled through various downstream circuits (e.g., circuits 104, 203, 650, and/or one or more elements illustrated in FIGS. 3-5 between the supply 201 and the processor 204), such as parasitic capacitance and parasitic inductance, which may cause delays between a time of the loading event on the downstream power supply rail and the time the first power supply can respond with increased current, for example. At 703, current is produced from a second power supply (e.g., the power supply 102, 202, 400, 500, and/or 691). The second power supply may be arranged near the load to respond faster to loading events, for example. The current is produced from the second power supply to the downstream power supply rail in response to loading events. The second power supply may be configured to be smaller and faster than the first power supply to provide smaller transient currents quickly in response to rapidly changing current demands of a target circuit, for example. The current may be produced within a second time period that is shorter than the first time period. At 704, the downstream feedback signal is generated in response to the loading event and provided to the first power supply. The first power supply may receive the feedback signal and increase an output current to meet the current demands of the load.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:
1. A circuit comprising:
a second power supply coupled to a second power supply rail, the second power supply configured to provide a second current to the second power supply rail in response to a loading event on the second power supply rail and generate a feedback signal indicating the loading event;
a first power supply coupled to the second power supply to receive the feedback signal and configured to produce a first current and a first voltage to a first power supply rail in response to the feedback signal; and
a downstream circuit coupled to the first power supply rail, the circuit configured to receive the first current and the first voltage from the first power supply and produce a second voltage on the second power supply rail based on the received first current and first voltage,
wherein the second current provided by the second power supply is transitory while the first current is provided through the circuit to respond to the loading event.

2. The circuit of claim 1 wherein the second power supply responds to the loading event faster than the first power supply.

3. The circuit of claim 1 wherein the first power supply is further configured to receive a second feedback signal based on the first voltage produced to the first power supply rail.

4. The circuit of claim 3 wherein the feedback signal modifies the second feedback signal to increase the first current from the first power supply when a third voltage on the second power supply rail drops below a nominal value.

5. The circuit of claim 3 further comprising at least one capacitor having a first terminal configured to receive the feedback signal and a second terminal coupled to a feedback input of the first power supply and to the first power supply rail.

6. The circuit of claim 3 wherein the feedback signal causes the first power supply to increase the first voltage produced to the first power supply rail for a predetermined time period.

7. The circuit of claim 3 wherein the first power supply is a switching regulator comprising a high side switching transistor, and wherein the feedback signal turns on the high side switching transistor to couple a power supply input voltage to the first power supply rail for a predetermined time period.

8. The circuit of claim 7 wherein the first power supply comprises a Buck switching regulator, and wherein the feedback signal increases an ON time of the high side switching transistor during one or more duty cycles of the Buck switching regulator.

9. The circuit of claim 1 wherein the downstream circuit comprises parasitic capacitance and parasitic inductance.

10. The circuit of claim 1 further comprising a clock sensor to sense the loading event.

11. The circuit of claim 1 further comprising a voltage sensor to sense the loading event.

12. The circuit of claim 1 further comprising a current sensor to sense the loading event.

13. The circuit of claim 1 wherein the second current is provided to a processor via the second power supply rail.

14. The circuit of claim 1 wherein the second power supply comprises:
an amplifier having an input coupled to a reference voltage and an output coupled to the second power supply rail; and
a current sensor configured to sense current from the output of the amplifier to the second power supply rail, and generate the feedback signal based on the sensed current.

15. The circuit of claim 14 wherein the current sensor comprises:
a resistor coupled between the output of the amplifier and the second power supply rail; and
a second amplifier having a first terminal coupled to a first terminal of the resistor, a second terminal coupled to a second terminal of the resistor, and an output to produce the feedback signal.

16. The circuit of claim 14 further comprising an averaging circuit having an input coupled to the current sensor to receive the feedback signal and an output coupled to a feedback input of the first power supply.

17. The circuit of claim 1 wherein the second power supply comprises:
a switching regulator having an input coupled to a third power supply rail having a third voltage greater than a fourth voltage on the second power supply rail, a control input coupled to a reference voltage, and an output coupled to the second power supply rail; and
a current sensor configured to sense current from the output of the switching regulator to the second power supply rail and generate the feedback signal based on the sensed current.

18. The circuit of claim 1, wherein the second power supply is located proximate to a load circuit coupled to the second power supply rail.

19. A circuit comprising:
a second power supply coupled to a second power supply rail, the second power supply configured to provide a second current to the second power supply rail in response to a loading event on the second power supply rail and generate a feedback signal indicating the loading event;
a first power supply coupled to the second power supply to receive the feedback signal and configured to produce a first current and a first voltage to a first power supply rail in response to the feedback signal; and
a downstream circuit coupled to the first power supply rail, the circuit configured to receive the first current and the first voltage from the first power supply and produce a second voltage on the second power supply rail based on the received first current and first voltage,
wherein the second current provided by the second power supply is transitory while the first current is provided through the circuit to respond to the loading event,
wherein the second power supply comprises:
a first transistor having a first terminal coupled to the second power supply rail, a second terminal coupled to a third power supply rail, and a control terminal;
a sense circuit to sense the loading event and generate a load event signal; and
a one-shot circuit having an input coupled to receive the load event signal and an output coupled to the control terminal of the first transistor, the one-shot circuit turning on the first transistor for a predetermined time period in response to the load event signal.

20. A method of supplying power comprising:
producing a first voltage and a first current from a first power supply to a first power supply rail in response to a feedback signal, the first power supply configured to produce current and voltage in response to a loading event on a second power supply rail within a first time period;
coupling the first voltage and first current through a first circuit to the second power supply rail;
producing a transitory second current from a second power supply to the second power supply rail in response to the loading event within a second time period that is shorter than the first time period; and
generating the feedback signal to the first power supply in response to the loading event.

21. An apparatus, comprising:
first means for producing a first voltage and a first current to a first power supply rail in response to a feedback signal, the first means configured to produce current and voltage in response to a loading event on a second power supply rail within a first time period;
means for coupling the first voltage and first current to the second power supply rail;
means for producing a transitory second current to the second power supply rail in response to the loading event within a second time period that is shorter than the first time period; and
means for generating the feedback signal to the first means in response to the loading event.

* * * * *